(12) United States Patent
Merrick, III

(10) Patent No.: US 7,730,939 B2
(45) Date of Patent: Jun. 8, 2010

(54) SAFETY CLAMP FOR WALKING BEAM COMPRESSOR

(75) Inventor: Ward S. Merrick, III, Edmond, OK (US)

(73) Assignee: Oil Flow USA, Inc., Harrisonburg, VA (US)

( * ) Notice: Subject to any disclaimer, the term of this patent is extended or adjusted under 35 U.S.C. 154(b) by 132 days.

(21) Appl. No.: 12/056,825

(22) Filed: Mar. 27, 2008

(65) Prior Publication Data

US 2009/0246037 A1 Oct. 1, 2009

(51) Int. Cl.
F04B 47/02 (2006.01)
E21B 43/12 (2006.01)
F16B 9/02 (2006.01)

(52) U.S. Cl. .................. 166/105; 166/68.5; 403/87; 403/257; 403/258; 403/260; 403/261

(58) Field of Classification Search ............. 166/105, 166/68.5; 403/87, 256–261
See application file for complete search history.

(56) References Cited

U.S. PATENT DOCUMENTS

| | | | |
|---|---|---|---|
| 1,775,733 A | 9/1930 | Phipps | |
| 2,049,315 A | 7/1936 | Patterson | |
| 3,010,843 A | 11/1961 | Eder | |
| 3,655,301 A | 4/1972 | McClung | |
| 3,989,394 A * | 11/1976 | Ellis | 403/46 |
| 4,153,395 A | 5/1979 | O'Neill et al. | |
| 4,189,157 A | 2/1980 | Mahan et al. | |
| 4,345,734 A | 8/1982 | Studinger | |
| 4,466,335 A | 8/1984 | Milburn, Jr. | |
| 4,530,646 A | 7/1985 | McCoy | |
| 4,536,134 A | 8/1985 | Huiber | |
| 4,550,805 A | 11/1985 | Zimmerman | |
| 4,557,351 A | 12/1985 | Volk | |
| 4,917,190 A | 4/1990 | Coppedge | |
| 5,165,699 A | 11/1992 | Shrontz et al. | |
| 5,209,495 A | 5/1993 | Palmour | |
| 5,290,156 A * | 3/1994 | Mayland | 417/415 |
| 5,382,141 A | 1/1995 | Stinessen et al. | |
| 5,628,516 A | 5/1997 | Grenke et al. | |
| 5,711,533 A | 1/1998 | Angelo et al. | |
| 5,845,909 A | 12/1998 | Angelo et al. | |
| 5,906,354 A | 5/1999 | Gilbert et al. | |
| 5,975,538 A | 11/1999 | Krause et al. | |
| 6,012,903 A | 1/2000 | Boelkins | |
| 6,164,935 A | 12/2000 | Turiansky | |
| 6,305,918 B2 | 10/2001 | Turiansky | |
| 6,330,790 B1 | 12/2001 | Arora et al. | |
| 6,572,116 B2 | 6/2003 | Turiansky | |
| 6,752,603 B2 | 6/2004 | Murase et al. | |
| 2003/0214100 A1 | 11/2003 | Pippert | |
| 2007/0157799 A1 | 7/2007 | Cochran et al. | |

* cited by examiner

FOREIGN PATENT DOCUMENTS

| | | |
|---|---|---|
| EP | 1236896 | 9/2002 |
| JP | 11-201037 | 7/1999 |

*Primary Examiner*—Giovanna C Wright
(74) *Attorney, Agent, or Firm*—Nutter McClennen & Fish LLP

(57) ABSTRACT

Various methods and devices are provided for securing a walking beam compressor to a walking beam. In general, the walking beam compressor is a gas compressor unit that can be disposed around a piston rod extending from a walking beam of an oil well. The piston rod can be coupled to the walking beam by a securing mechanism that engages both the piston rod and the walking beam to prevent the piston rod from disengaging from the walking beam during rocking movement of the walking beam.

14 Claims, 5 Drawing Sheets

FIGURE 4A
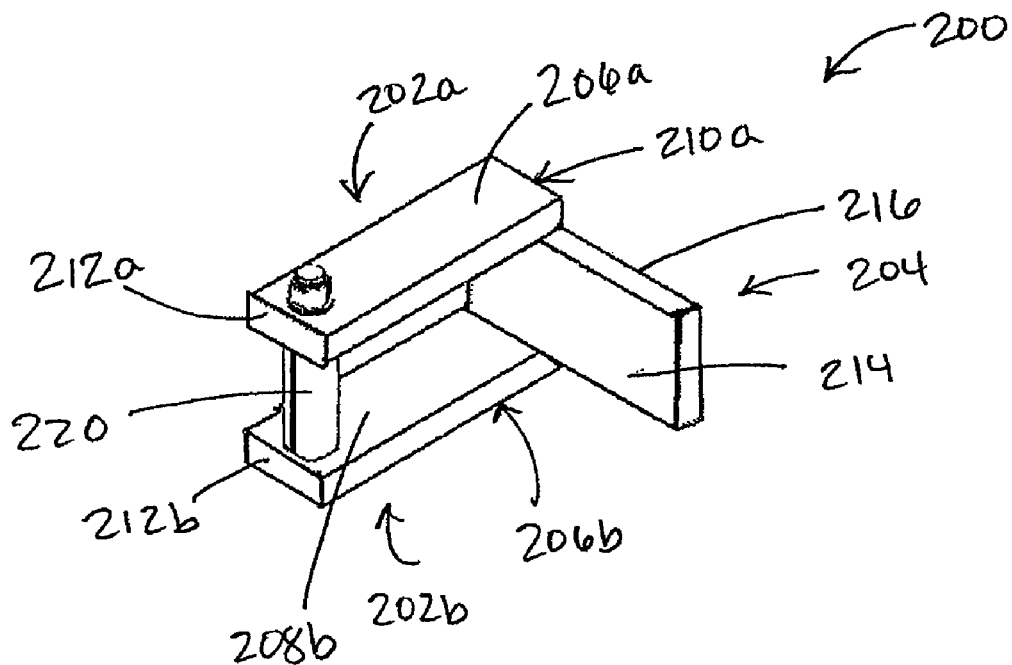
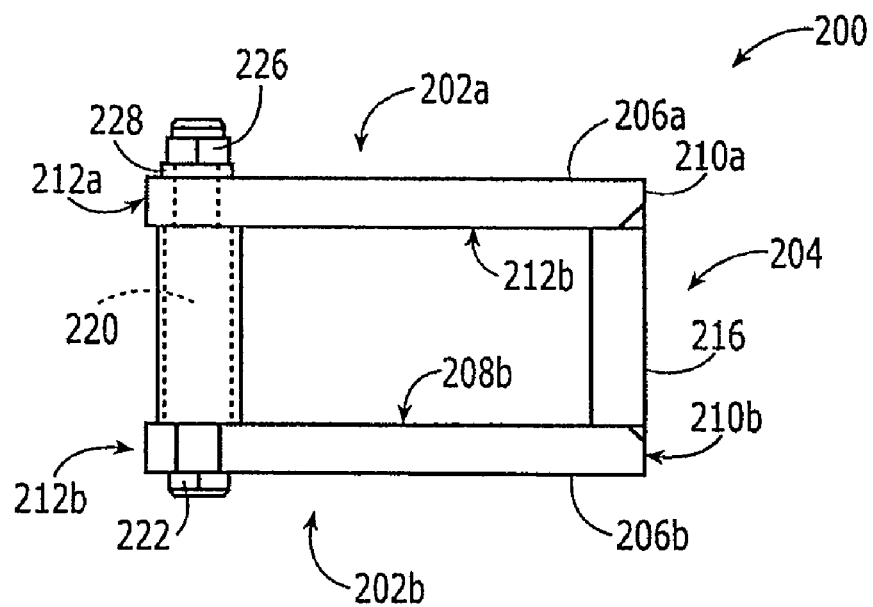
FIGURE 4B

SAFETY CLAMP FOR WALKING BEAM COMPRESSOR

FIELD OF THE INVENTION

The present invention relates to gas compressors to be used with oil wells, and in particular to methods and devices for securing a walking beam compressor to a walking beam.

BACKGROUND OF THE INVENTION

A common oil well pumping system includes a walking beam mounted upon a horizontally-axised, transverse pivot at the top of a Samson post. One end of the walking beam is connected to a pump rod and the other end is connected to the crank of a drive motor through a connecting rod. Rotation of the crank causes the walking beam to rock or oscillate in a vertical plane to raise and lower the pump rod. The rod-connected end of the walking beam is provided with the familiar "horse head" to keep the pump rod in alignment with the well axis. The opposite end of the walking beam carries a counterbalance weight to offset the weight of the pump rod and minimize the stress on the motor.

When pumping an oil well, both oil and gas may be produced and the capture of the gas is both profitable and better for the environment. Thus, an oil well pumping system can include a compressor unit mounted between the walking beam and a stationary part of the pumping unit for compressing the natural gas produced during the pumping of the oil. Such a compressor unit is called a walking beam compressor because it has a piston rod that is coupled to the walking beam. Rocking of the walking beam reciprocates the piston rod to effect intake and compression strokes. Over time, due to the reciprocating motion, the connection between the piston rod and the walking beam can weaken or break. This can cause two problems. First, as the piston rod loosens, the piston rod stroke length within the compressor changes. The additional stroke length can cause the piston to bottom out against the bottom of the compressor, damaging both the compressor and the piston assembly. Second, the piston rod will eventually become completely detached from the walking beam. This may cause the compressor and piston rod to fall away from the walking beam, resulting in costly damage and possibly a dangerous situation.

Accordingly, there is a need for methods and devices that can effectively secure a piston rod to a walking beam of an oil well pump.

SUMMARY OF THE INVENTION

The present invention generally provides a safety clamp for use with a walking beam compressor. In one embodiment, an oil well pump is provided and includes a walking beam for pumping oil out of the ground. A housing can be mated to the walking beam and can have a piston rod extending therefrom configured for reciprocal longitudinal movement in response to rocking movement of the walking beam. A safety clamp can be coupled to the housing and the piston rod and it can be configured to prevent the piston rod from rotating relative to the housing. While the piston rod can be mated to the housing in various ways, in one embodiment the piston rod can be threadably mated to the housing. For example, the housing can include a threaded bore to receive a threaded terminal end of the piston rod. In one exemplary embodiment, the housing can be a clevis eye. The walking beam can have a beam plate coupled thereto and the housing can be rotatably mated to a bracket extending from the beam plate.

The safety clamp can have a variety of configurations, but in general the safety clamp can be configured to prevent the piston rod from rotating relative to the housing. In one embodiment, the safety clamp can include first and second legs that can engage opposing recesses in the piston rod. The safety clamp can further include a central arm extending from between the first and second legs that can be coupled to the housing such that the safety clamp is substantially L-shaped. The safety clamp can also include a retaining element extending between the first and second clamping legs and configured to secure the clamping legs to the piston rod.

In another exemplary embodiment, an oil well pump is provided having a walking beam for pumping oil out of the ground. A housing, for example a clevis eye, can be rotatably coupled to the walking beam and can have a threaded bore formed therein. A piston rod having a first threaded terminal end can be threadably mated to the threaded bore in the housing and can have a second terminal end extending into a compressor configured to receive and compress gas contained with oil pumped out of the ground. The oil well pump can further include a safety clamp coupled to the housing and the piston rod and configured to prevent the piston rod from unthreading from the housing.

In one embodiment, the safety clamp can include first and second clamping legs positioned in opposing recesses in the piston rod. The safety clamp can further include a central arm extending from between the first and second clamping legs and coupled to the housing. The clamping legs and central arm can be configured to prevent the piston rod from rotating. In one embodiment, the central arm extends substantially perpendicular to the first and second clamping legs to form a substantially L-shaped safety clamp. The safety clamp can further include a retaining element extending between the first and second clamping legs and configured to secure the clamping legs to the piston rod.

In other aspects, methods of securing a piston rod to a walking beam on an oil well pump are provided. In one embodiment, the method can include threading a piston rod into a housing coupled to a walking beam for pumping oil out of the ground, and coupling a safety clamp to the housing and the piston rod to prevent the piston rod from unthreading from the housing. In one embodiment, coupling the safety clamp to the housing can include bolting a central arm of the safety clamp to the housing. Further, coupling the safety clamp to the piston rod can include positioning first and second clamping legs of the safety clamp within opposing recesses formed in the piston rod. A retaining element can be bolted to the first and second clamping legs to prevent removal of the first and second clamping legs from the piston rod.

BRIEF DESCRIPTION OF THE DRAWINGS

The invention will be more fully understood from the following detailed description taken in conjunction with the accompanying drawings, in which:

FIG. 4A is a perspective view of the safety clamp of FIG. 1;

FIG. 4B is a top view of the safety clamp of FIG. 1;

DETAILED DESCRIPTION OF THE INVENTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

The present invention generally provides a safety clamp for use with a walking beam compressor and methods for assembling and using the same. In general, a walking beam compressor is a gas compressor unit that can be disposed around a piston rod extending from a walking beam of an oil well or oil rig. The piston rod can be coupled to the walking beam by a securing mechanism mated therebetween. While the securing mechanism can have various configurations, in an exemplary embodiment the securing mechanism includes a safety clamp that can couple to both the piston rod and a housing mated to the walking beam. The safety clamp can be configured to prevent the piston rod from disengaging from the housing in response to rocking of the walking beam.

Figure 1:
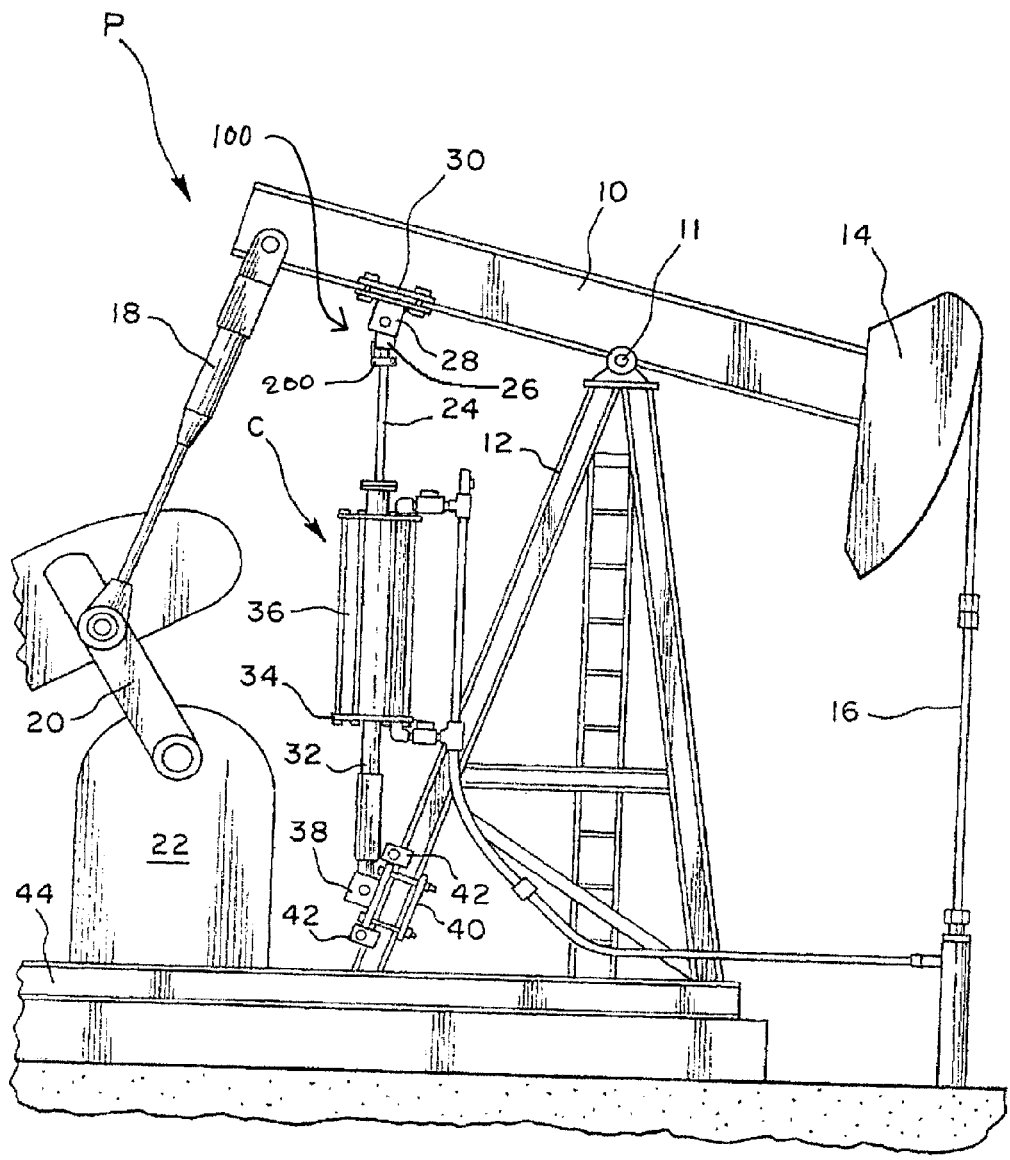
FIG. 1 is a side-view of one embodiment of an oil well pump having a compressor coupled to a walking beam by a securing mechanism having a safety clamp.

FIG. 1 shows one embodiment of an oil well pump P having a compressor C mounted thereon. As shown, the oil well pump P generally includes a walking beam 10 pivotally mounted to a top of a Samson post 12 by a bearing 11. A horsehead 14 on one end of the walking beam 10 can be connected to a rod 16 for operating a downhole pumping system as is well understood in the oil production industry. A connecting rod 18 can be connected through a linkage 20 to a gear box 22 which drives the pump P. The compressor C can have a lower cover plate 34 with a lower support leg 32 coupled thereto and extending therebetween. A bottom portion of the support leg 32 can be pivotally connected to a bracket 38 attached to a leg of the Samson post 12 by a clamp 40. Additional clamps 42 can be provided at each end of clamp 40, as shown, to minimize possible movement of the clamp 40 along the leg of Samson post 12 during the pumping operation. It will be appreciated by those skilled in the art that the lower cover plate 34, and hence the bottom portion of the compressor, can be coupled to any stationary portion of the oil well pump P as needed. For example, the lower cover plate 34 can also be attached to a base 44, if desired. The compressor C can have a piston rod 24 attached at its upper end to a securing mechanism 100 and that terminates at its lower end within the compressor C. The securing mechanism 100 can generally be effective to couple the piston rod 24 to the walking beam 10 in such a manner that prevents the piston rod 24 from disengaging from the walking beam 10 during operation of the oil well pump P. Exemplary oil well pumps and compressors are described in more detail in U.S. Pat. No. 6,572,116 of Turiansky, U.S. Pat. No. 6,164,935 of Turiansky, and U.S. Pat. No. 6,305,918 of Turiansky, incorporated herein by reference in their entireties.

Figure 2:
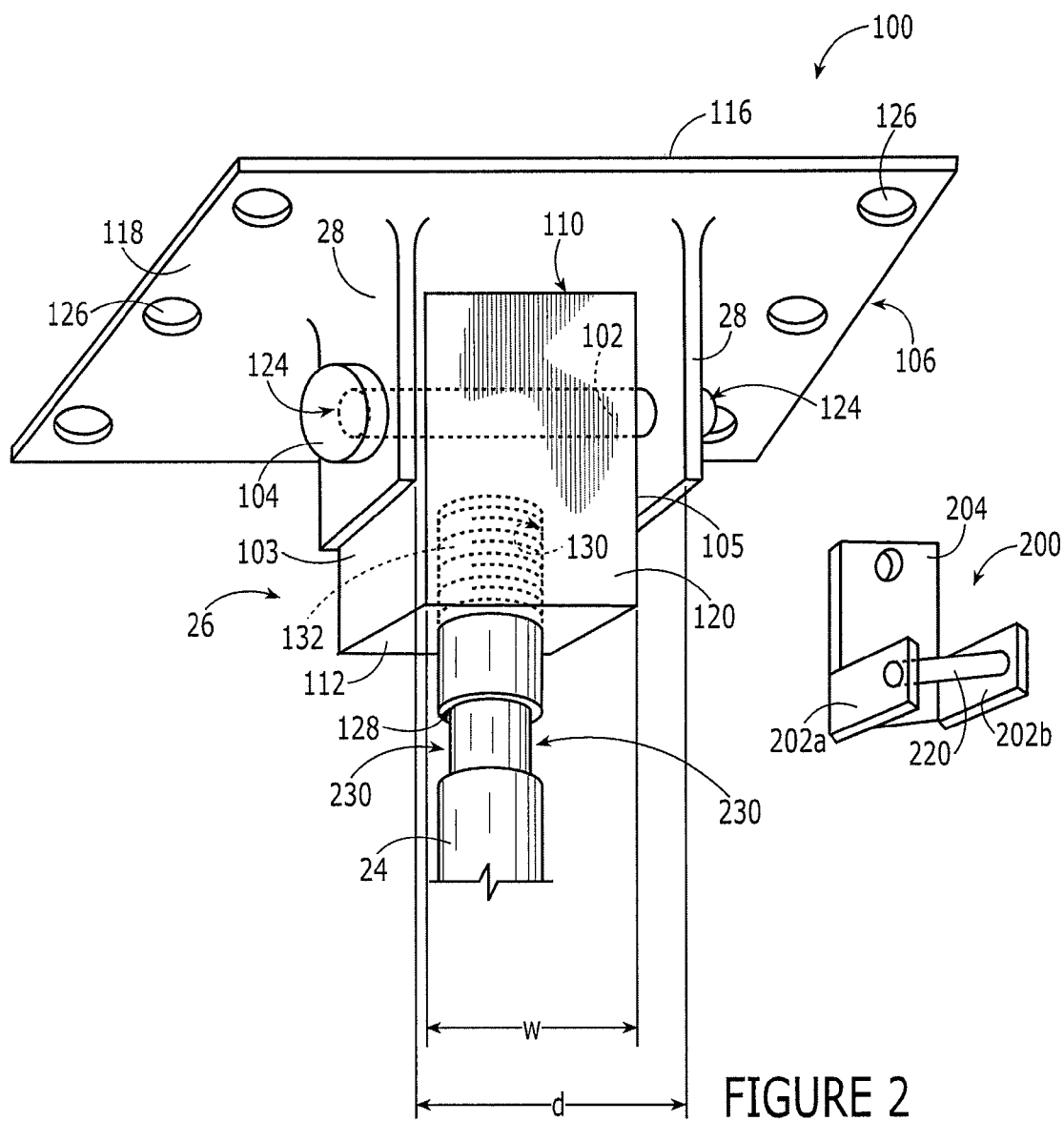
FIG. 2 is a perspective view of the securing mechanism of FIG. 1.
Figure 3:
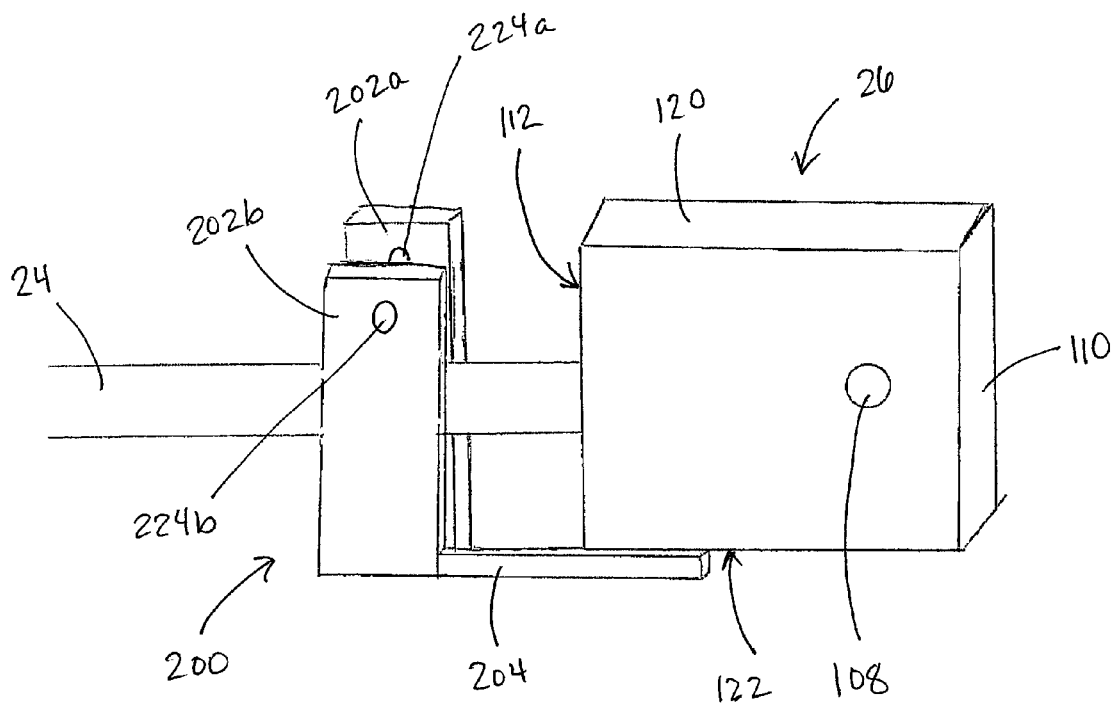
FIG. 3 is a perspective view of the safety clamp of FIG. 1 coupled to a piston rod and a housing.
Figure 4C:
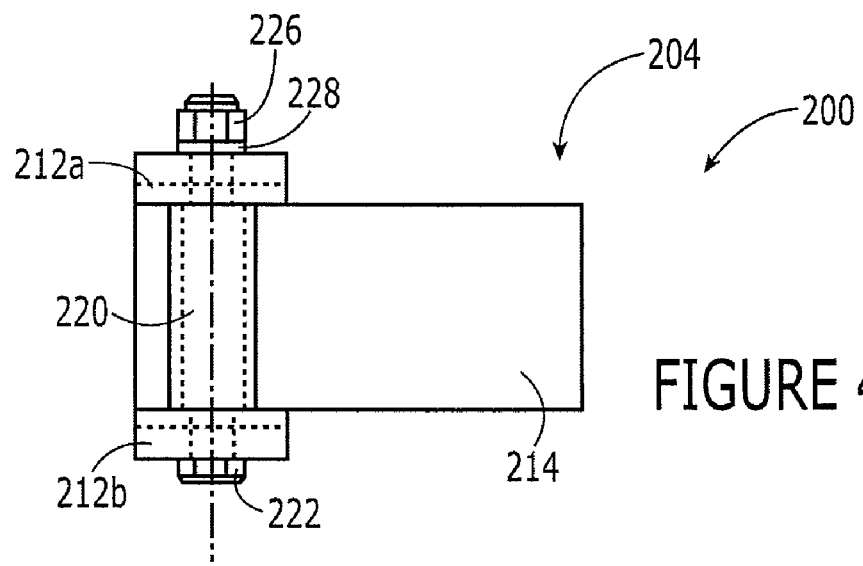
FIG. 4C is a head-on view of the safety clamp of FIG. 1.
Figure 4D:
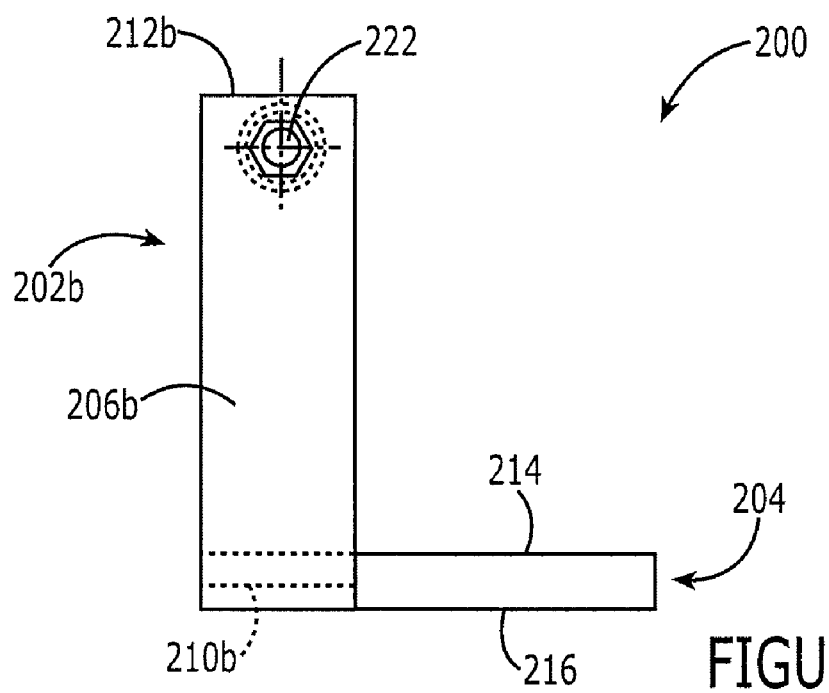
FIG. 4D is a side view of the safety clamp of FIG. 1.

While many securing mechanisms are possible for coupling the walking beam compressor C to the walking beam 10, FIG. 2 illustrates one embodiment of the securing mechanism 100. The securing mechanism 100 generally provides a mechanism to ensure that the piston rod 24, and thereby the compressor C, remains coupled to the walking beam 10. In the illustrated embodiment, the securing mechanism 100 generally includes a housing 26 for mating with a proximal portion of the piston rod 24. The housing 26 can be coupled via a retaining rod 102 and a bearing 104 to a walking beam plate 106, which is fastened to the walking beam 10. A safety clamp 200 can be attached between the piston rod 24 and the housing 26, as shown in FIG. 3, to ensure that the piston rod 24 does not come uncoupled from the housing 26.

The housing 26 can have various configurations but is preferably effective to receive an upper or proximal end of the piston rod 24 to join the piston rod 24, and thereby the compressor C which is disposed around a lower distal end of the piston rod 24, to the walking beam 10. A person skilled in the art will appreciate that there are many variations of housings for joining a piston rod 24 to a walking beam 10, however, in the illustrated embodiment the housing 26 is in the form of a clevis eye having the shape of a generally rectangular box. As shown in FIGS. 2 and 3, the housing 26 can have a top sidewall 110 and a bottom sidewall 112, as well as a front sidewall 120 generally facing in a direction towards the horsehead 14 of the oil well and an opposed back sidewall 122. A bore 108 can be formed through left and right sidewalls 103, 105 of the housing 26 in a configuration parallel to the top and bottom sidewalls 110, 112 for receiving the retaining rod 102. The bore 108 can be formed at a position on the left and right sidewalls 103, 105 that is centered between the front and back sidewalls 120, 122. The bore 108 can also be centered between the top and bottom sidewalls 110, 112, but in an exemplary embodiment as shown, it can be positioned closer to the top sidewall 110.

While various techniques can be used for coupling the housing 26 to the walking beam 10, in an embodiment the housing 26 can be coupled to the walking beam 10 by a beam plate 106 having two beam plate brackets 28 extending in a downward direction substantially perpendicular to the beam plate 106. The beam plate 106 can have a top surface 116 for fixedly mating to an upper beam plate 30, shown in FIG. 1. The beam plates 106, 30 together engage the walking beam 10. The beam plate 106 can further include a bottom surface 118 from which the beam plate brackets 28 can extend. The beam plate brackets 28 can be integrally formed with the beam plate 106 such that the brackets 28 and the beam plate 106 are formed from a single piece of material, such as, for example, steel and/or titanium. Alternatively, the beam plate brackets 28 can be coupled to the beam plate 106 by any fastening mechanism known in the art, including but not limited to retaining rods, bolts, adhesive, etc.

While there are many configurations possible for the beam plate brackets 28, in one embodiment the beam plate brackets 28 can be spaced a distance d apart that is slightly larger than a width w of the housing 26 such that the beam plate brackets 28 can be positioned adjacent to the left and right sidewalls 103, 105 of the housing 26 with the top sidewall 110 of the housing 26 being in proximity to the bottom surface 118 of the beam plate 106. The beam plate brackets 28 can each have a bore 124 formed therethrough that can be aligned with the bore 108 formed in the housing 26. The retaining rod 102 can extend through the bore 108 in the housing 26 and through the bores 124 in the beam plate brackets 28 positioned on each side of the housing 26. A rotary bearing 104 can optionally be positioned within the bores 124 in the beam plate brackets 28 to connect the retaining rod 102 between the housing 26 and the beam plate brackets 28, thereby allowing the beam plate 106 and the beam plate brackets 28 to rotate with respect to the housing 26 in response to the reciprocating motion of the walking beam 10.

The beam plate 106 can be mated with the upper beam plate 30 using a variety of fastening mechanisms known in the art. In one embodiment, as shown in FIG. 2, the beam plate 106 can include a plurality of fastening holes 126, such as bolt holes, for receiving fastening members, such as bolts, for mating with the upper beam plate 30 and thus the walking beam 10. In particular, in one embodiment, fastening members can extend through the fastening holes 126 in the beam plate 106 to extend through corresponding holes in the walking beam 10 and into receiving holes in the upper beam plate 30. A person skilled in the art will appreciate that any fastening mechanism known in the art can be used to fasten the beam plate 106 with the walking beam 10. In this way, the beam plate 106 and beam plate brackets 28 can be rigidly attached to the walking beam 10. In effect, because the walking beam 10 reciprocates in an arcuate configuration with respect to a flat surface, such as the ground, the rigidly attached beam plate 106 and beam plate brackets 28 have a corresponding arcuate motion. Thus, the retaining rod 102 and the rotary bearings 104 allow the beam plate 106 and beam plate brackets 28 to rotate with respect to the housing 26, thereby effectively converting the arcuate motion of the walking beam 10 and the beam plate 106 into vertical longitudinal motion. In this way, the housing 26 can be configured to move in a vertical or longitudinal direction. This vertical motion in the housing 26 is transferred to the piston rod 24 to effect intake and compression strokes within the walking beam compressor C.

The piston rod 24 can be mated to the housing 26 by any securing mechanism known in the art effective to rigidly attach the piston rod 24 to the housing 26. In the exemplary embodiment shown in FIG. 2, the bottom sidewall 112 of the housing 26 includes a circular bore 128 formed therein having threads formed around an interior surface 130 thereof for receiving a threaded terminal or proximal end 132 of the piston rod 24. Thus, the piston rod 24 can be threadably mated to the housing 26 to receive the vertical reciprocal motion that has been "converted" from the arcuate motion of the walking beam 10. A distal portion of the piston rod 24 can extend into the walking beam compressor C to effect intake and compression strokes therein to receive and compress gas. It is the reciprocal motion associated with the piston rod 24, however, that can cause the threaded proximal end 132 of the piston rod 24 to gradually back out of or become unthreaded from the threaded bore 128 in the housing 26. Over time, as the piston rod 24 slowly unscrews from the bore 128 in the housing 26, the effective length of the piston rod 24 increases. The increased length of the piston rod 24 increases the length of the compression strokes within the compressor C. Increased compression strokes can cause a distal end of the piston rod 24 to "bottom out" in the compressor C causing damage to both the compressor C and to the piston rod 24. Further, if the threaded proximal end 132 of the piston rod 24 backs out far enough, it will eventually become completely disengaged from the housing 26 and can cause the compressor C to fall away from the walking beam 10. Thus, the safety clamp 200 is provided to prevent rotation of the piston rod 24 relative to the housing 26.

The exemplary embodiment of the safety clamp 200 is illustrated in more detail in FIGS. 4A-4D, although some aspects of the safety clamp 200 can also be seen in FIGS. 2 and 3. As shown in FIGS. 4A-4D, the safety clamp 200 can include first and second clamping legs 202a, 202b mated to opposed sides of a central extension 204 such that the first and second clamping legs 202a, 202b are spaced apart from one another and extend in a generally parallel configuration to each other and in a direction that is perpendicular to the central extension member 204. The first and second clamping legs 202a, 202b can have a variety of shapes and configurations, but in the illustrated embodiment the clamping legs 202a, 202b have a generally elongate rectangular shape. The first and second clamping legs 202a, 202b can have exterior surfaces 206a, 206b that face away from each other and interior surfaces 208a, 208b that face towards each other. The first and second clamping legs 202a, 202b can also have first ends 210a, 210b and second ends 212a, 212b. The central extension member 204 can also have a variety of shapes and configurations, but in the illustrated embodiment, the central extension member 204 has a generally elongate rectangular shape with an interior surface 214 that faces in the direction of the clamping legs 202a, 202b and an exterior surface 216 that faces in a direction away from the clamping legs 202a, 202b. The central extension member 204 can mate to the interior surfaces 208a, 208b of the first and second clamping legs 202a, 202b at or adjacent to the first ends 210a, 210b such that the central extension member 204 and the first and second clamping legs 202a, 202b form a substantially L-shaped clamp.

The safety clamp 200 can be formed of any material known in the art having the required strength properties, including but not limited to steel and/or titanium. Thus, any mating technique known in the art for mating such materials can be used to mate the central extension member 204 with the first and second clamping legs 202a, 202b. For example, the central extension member 204 and the first and second clamping legs 202a, 202b can be welded, extruded, or integrally formed from a single piece of material. Alternatively, they can be mated with fastening members such as bolts or retaining rods, or they can be glued. A person skilled in the art will appreciate the many alternatives for mating the central extension member 204 with the clamping legs 202a, 202b.

While there are many ways to secure the safety clamp 200 to the piston rod 24, in one exemplary embodiment the safety clamp 200 can include a retaining element 220 for securing the first and second clamping legs 202a, 202b around the piston rod 24, as will be described in more detail below. The retaining element 220 can have a generally cylindrical shape and can extend between interior surfaces 208a, 208b of the second ends 212a, 212b of the first and second clamping legs 202a, 202b. The retaining member 220 can be hollow and can therefore receive a fastening member 222, such as a threaded bolt, therethrough. In particular, the first and second clamping legs 202a, 202b can include bores 224a, 224b formed through the second ends 212a, 212b, as shown in FIG. 3. In this way, the fastening member 222 can be inserted through the bore 224b in the second clamping leg 202b to extend through the retaining element 220 and through the bore 224a in the first clamping leg 202a. A threaded securing element, such as a nut 226 and a washer 228, can engage the fastening member 222 thereby securing the retaining element 220 between the first and second clamping legs 202a, 202b. As will be appreciated by those skilled in the art, the fastening member 222 can also be initially inserted through the first clamping leg 202a to extend through the retaining member 220 and the second clamping leg 202b and thereby be secured. A person skilled in the art will further appreciate that any fastening mechanism known in the art can be used to secure the clamping legs together and/or to secure the retaining element between the first and second clamping legs.

In one embodiment, the safety clamp 200 can mate to both the piston rod 24 and the housing 26. As shown in FIG. 2, the piston rod 24 can have opposed cut-outs, notches, or recesses 230 formed in a proximal portion thereof, preferably at a location just below where the piston rod 24 mates with the housing 26. The recesses 230 can have a shape and size that will snuggly seat the first and second clamping legs 202a, 202b therein. In particular, as best shown in FIG. 3, the opposed recesses 230 in the piston rod 24 each have a generally rectangular shape such that they are configured to seat middle portions of the first and second clamping legs 202a, 202b. As a result, the central extension member 204 will be positioned on one side of the piston rod 24 and the retaining member 220 will extend between the first and second clamping legs 202a, 202b on a side of the piston rod 24 opposed to the central extension member 24. In general, as will be appreciated by those skilled in the art, the first and second clamping legs 202a, 202b can be simply seated within the recesses 230 by way of a press fit, without any need for a fastening or securing mechanism. In other exemplary embodiments, the first and second clamping legs 202a, 202b can be, for example, fastened, glued, or otherwise fixedly attached to or integrally formed with the recesses 230 in the piston rod 24. The central extension member 204 can extend in a direction parallel to the piston rod 24 and perpendicular to the first and second clamping members 202a, 202b to mate with the housing 26 situated above the opposed recesses 230 in the piston rod 24. In one embodiment, the central extension member 204 can be positioned such that its interior surface 214 is positioned adjacent to the back portion 122 of the housing 26, as is most clearly shown in FIG. 3. The central extension member 204 can be rigidly mated to the housing 26 using any method known in the art, including but not limited to a fastening member, press fit, adhesive, etc. A person skilled in the art will appreciate, however, that the central extension member 204 can extend from any portion of the clamping legs 202a, 202b and can extend into and/or mate to any portion of the housing 26.

In use, because the safety clamp 200 is a generally rigid member that will rigidly engage the piston rod 24 and the housing 26, the safety clamp 200 will prevent rotation between the piston rod 24 and the housing 26. In particular, since the first and second clamping legs 202a, 202b are rigidly mated to the central extension member 204, the first and second clamping legs 202a, 202b effectively "grip" the piston rod 24 and correspondingly do not allow the piston rod 24 to rotate. The retaining member 220 can secure the first and second clamping legs 202a, 202b together to prevent the first and second clamping legs 202a, 202b from expanding if the piston rod 24 attempts to rotate. Thus, the piston rod 24 is held securely in place and cannot back out or rotate out of the threaded bore 128 in the housing 26 in response to the rocking of the walking beam. A person skilled in the art will appreciate that there are many other configurations possible for the safety clamp 200, and the embodiments disclosed herein are not intended to limit the use of the safety clamp 200 to the particular embodiments illustrated. Any configuration in which the safety clamp is mated to the walking beam or other portion of the oil well in such a way as to prevent the piston rod from rotating with respect to the housing is to be included in the embodiments and invention described herein.

Methods of securing a piston rod to a walking beam on an oil well pump are also provided. In one exemplary embodiment, a piston rod can have a walking beam compressor disposed around a distal end thereof. A proximal portion of the piston rod can be threaded into a bore within a housing that is coupled to the walking beam of an oil well. Generally, a safety clamp can be coupled between the housing and the piston rod to secure the two together and to prevent the piston rod from unthreading from the bore in the housing. In an exemplary embodiment, first and second clamping legs can be positioned within opposed recesses formed in the piston rod, preferably at a distance below where the piston rod threads into the housing. The central extension member can be secured to the housing, for example, by a fastening member such as a bolt, an adhesive, or a press fit. The clamping legs can be secured around the piston rod, and while there are many ways to do so, in one embodiment, a hollow, cylindrical retaining element can be positioned between the first and second clamping legs. A fastening member, such as a bolt, can be inserted through a bore formed in the first clamping leg, through a center of the retaining member, and into a bore formed in the second clamping leg. A nut and washer system or other fastening mechanism can be tightened to the threaded end of the bolt to secure the two clamping legs together with the retaining member therebetween. Thus, a rigid center extension member is coupled to a rigid housing that cannot rotate. First and second rigid clamping legs are mated to the central extension member and seated within recesses formed in the piston rod. In this way, because the central extension member cannot rotate, the first and second clamping legs are prevented from rotating. In the same way, the first and second clamping legs prevent the piston rod from rotating. This exemplary method of assembly prevents the piston rod from unthreading or unscrewing from the housing during the reciprocal motion produced by the walking beam.

A person skilled in the art will appreciate that, while the exemplary method is described in connection with the particular embodiments disclosed herein, the method can vary significantly depending on the particular configuration of the securing mechanism, as well as the configuration of the walking beam compressor.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. An oil well pump, comprising:
a walking beam for pumping oil out of the ground;
a housing mated to the walking beam and having a piston rod extending therefrom; and
a safety clamp coupled to the housing and the piston rod and configured to prevent the piston rod from rotating relative to the housing, wherein the safety clamp includes first and second legs that engage opposing recesses in the piston rod, and wherein the safety clamp includes a retaining element extending between the first and second clamping legs and configured to secure the clamping legs to the piston rod.

2. The oil well pump of claim 1, wherein the piston rod is threadably mated to the housing.

3. The oil well pump of claim 1, wherein the safety clamp further includes a central arm extending from between the first and second legs and coupled to the housing.

4. The oil well pump of claim 2, wherein the housing includes a threaded bore configured to threadably receive a threaded terminal end of the piston rod.

5. The oil well pump of claim 1, wherein the housing comprises a clevis eye.

6. The oil well pump of claim 1, wherein the walking beam includes a beam plate coupled thereto, and wherein the housing is rotatably mated to a bracket extending from the beam plate.

7. The oil well pump of claim 1, wherein the piston rod is configured for reciprocal longitudinal movement in response to rocking movement of the walking beam.

8. The oil well pump of claim 1, wherein the safety clamp is substantially L-shaped.

9. An oil well pump, comprising:

a walking beam for pumping oil out of the ground;

a housing rotatably coupled to the walking beam and having a threaded bore formed therein;

a piston rod having a first threaded terminal end threadably mated to the threaded bore in the housing and a second terminal end extending into a compressor configured to receive and compress gas contained with oil pumped out of the ground; and a safety clamp coupled to the housing and the piston rod and configured to prevent the piston rod from unthreading from the housing, wherein the safety clamp includes first and second clamping legs positioned in opposing recesses in the piston rod, and wherein the safety clamp includes a retaining element extending between the first and second clamping legs and configured to secure the clamping legs to the piston rod.

10. The oil well pump of claim 9, wherein the safety clamp includes a central arm extending from between the first and second clamping legs and coupled to the housing, the clamping legs and central arm configured to prevent the piston rod from rotating.

11. The oil well pump of claim 10, wherein the central arm extends substantially perpendicular to the first and second clamping legs to form a substantially L-shaped safety clamp.

12. The oil well pump of claim 9, wherein the housing comprises a clevis eye.

13. A method of securing a piston rod to a walking beam on an oil well pump, comprising:

threading a piston rod into a housing coupled to a walking beam for pumping oil out of the ground;

coupling a safety clamp to the housing and the piston rod to prevent the piston rod from unthreading from the housing, wherein coupling the safety clamp to the piston rod comprises positioning first and second clamping legs of the safety clamp within opposing recesses formed in the piston rod; and bolting a retaining element to the first and second clamping legs to prevent removal of the first and second clamping legs from the piston rod.

14. The method of claim 13, wherein coupling the safety clamp to the housing comprises bolting a central arm of the safety clamp to the housing.

\* \* \* \* \*